3,006,264

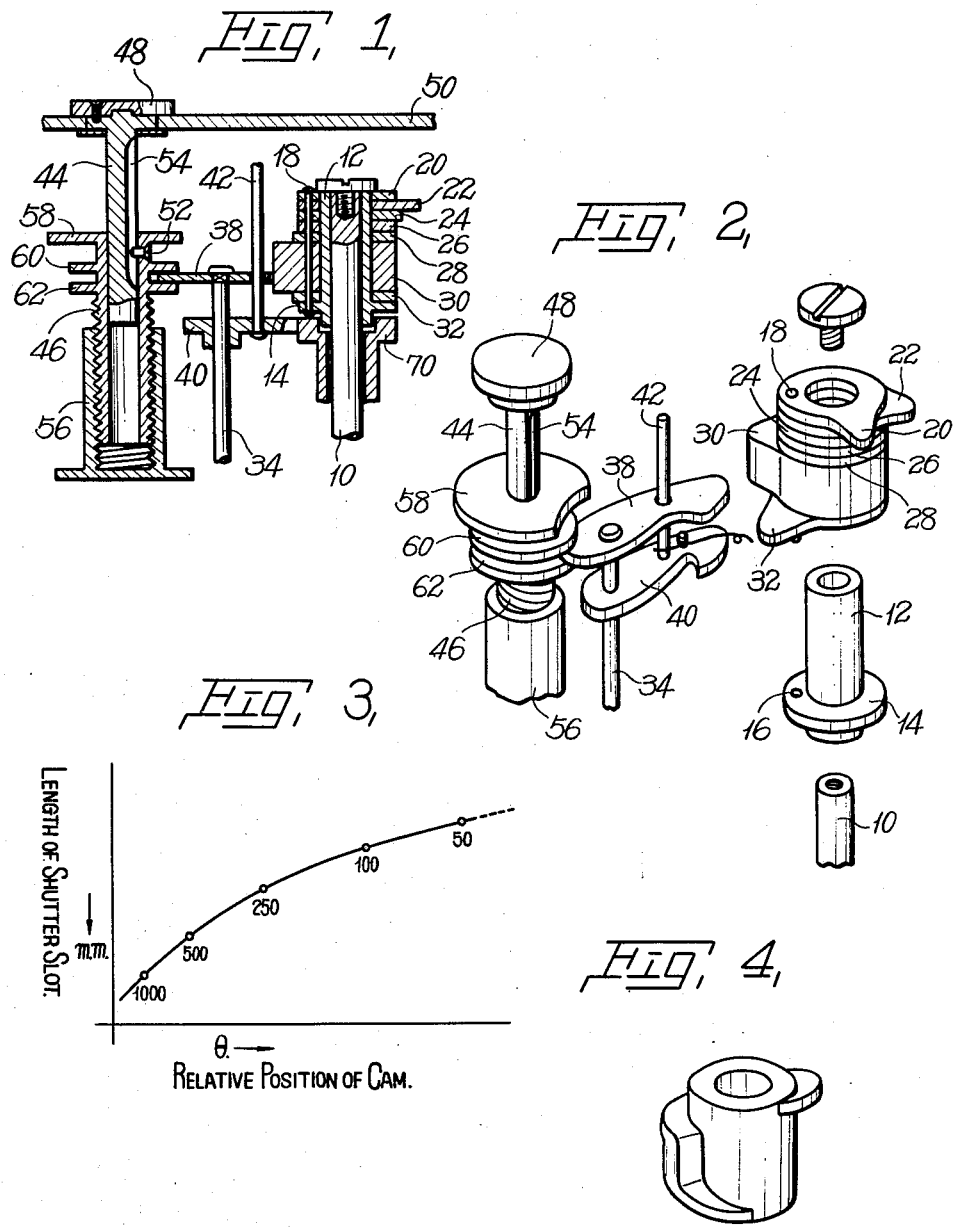

EXPOSURE REGULATOR FOR A FOCAL PLANE SHUTTER CAMERA

Keiji Kodera, Tokyo, Japan, assignor to Kabushiki Kaisha Aires Shashinki Seisakusho, Tokyo, Japan
Filed Jan. 27, 1959, Ser. No. 789,306
4 Claims. (Cl. 95—57)

This invention relates to an improvement in a focal plane shutter camera, and particularly to an exposure regulator for such cameras.

In a well known mechanism for a focal plane shutter camera, there are a first shaft on which a first curtain is rolled up and a second shaft on which a second curtain is rolled up, the second curtain being actuated after the first curtain has passed through a predetermined distance so as to constitute a shutter slot between the rear edge of the first curtain and the front edge of the second curtain, and the second curtain being actuated by the motion of the first shaft in that an actuating pawl for the second shaft is kicked by a part connected with the first shaft. In general, in such a mechanism as above, a speed dial is so mounted that the same is revolved together with the first shaft and the speed dial is so connected with the first shaft as to regulate the extent of the shutter slot in accordance with a required exposure. Furthermore, the speed dial is mounted outside a housing of a camera. Therefore, there are disadvantageous cases where one touches the dial by accident during an exposure.

A primary object of this invention is to provide an exposure regulator for a camera of the class described in which a speed dial is not revolved in accordance with an action of the curtains.

Another object of this invention is to provide an exposure regulator in which the speed dial is calibrated on an equidistant scale.

Still another object of this invention is to provide an exposure regulator whereby the exposure period may be varied continuously.

Briefly stated in accordance with one aspect of this invention, there are a plurality of cams, an actuating pawl for the second shaft and a means for positioning the pawl. The cams are mounted on and detachably fixed to the first shaft. The actuating pawl in accordance with this invention is capable of following any one of the cams. The means for positioning the actuating pawl is capable of positioning the pawl in contact with any one of the cams so as to actuate the actuating pawl in accordance with the motion of any one of the cams.

The invention will be better understood and other objects and additional advantages of the invention will become apparent upon perusal of the following description taken in connection with the drawings in which:

FIG. 1 is a vertical sectional front view of an embodiment of this invention;
FIG. 2 is an exploded perspective view thereof;
FIG. 3 is a graph of the exposure period; and
FIG. 4 is a perspective view of another cam to be used in a modification of the embodiment.

Similar numerals refer to similar parts throughout the several views.

Referring more particularly to the drawings, the preferred embodiments of this invention will now be described; however, this description will be understood to be illustrative of the invention and not as limiting it to the particular constructions shown and described. There is a first shaft 10 on which a spring-loaded first curtain (not shown) is rolled up. The first shaft 10 is surrounded by and secured to a sleeve 12 having a flange 14 through which an axial hole 16 is provided. A plurality of disc cams is mounted on the sleeve 12 and the flange 14 thereof in order of the cams 20, 22, 24, 26, 28, 30, and 32 from the top. A knock pin 18 is inserted through axial holes provided in the cams, respectively, and the hole 16 of the flange 14 so as to fix the cams to the flange. The cams 20 to 28 are the same in contour and dimension, but their protrusions are directed differently with one another by means of locating the holes through which the pin 18 is inserted, differently with one another. The cam 30 is the same as the above cams in cross-section but has a thickness of five times the thickness of any of the above five cams or equal to the total thickness of the cams 20 to 28. There is the lowermost cam 32 similar to any of the cams 20 to 28. These cams will be explained more in detail hereinafter.

There is a pin 34 in parallel with the first shaft 10. Pin 34 is mounted so as to be rotatable about its axis and also axially slidable by any suitable means (not shown). An actuating pawl 38 is fixedly secured on the top of the pin 34 at right angles. A second pawl 40 is mounted on the pin 34 so as to be rotatable with and axially slidable along it. A second pin 42 is set in the upper face of the second pawl 40 and inserted through a hole provided in the actuating pawl 38 so as to be axially slidable with respect to it. The second pawl 40 is operatively associated with a sleeve 70 mounted on the first shaft 10 rotatably with respect to it. A spring-loaded second curtain (not shown) is rolled up on the sleeve 70.

A dial shaft 44 is arranged in parallel with the first shaft 10 and inserted rotatably and not axially slidably through a hole provided in the housing 50. A dial 48 is secured to the top of the dial shaft 44. The bottom end of the dial shaft 44 is inserted axially slidably but not rotatably in a sleeve-like externally threaded member 46 by means of a set screw 52 provided in the externally threaded member 46 and a flute 54 provided in the dial shaft 44. The externally threaded member 46 having a helicoid thread or threads on its outside is adapted to be in engagement with an internally threaded member 56 secured to the housing 50. Thus it becomes possible to displace the externally threaded member 46 axially by means of turning the dial 48. Two flanges 60 and 62 protrude radially from the externally threaded member 46. A space between the two flanges 60 and 62 is adapted to associate with the actuating pawl 38 in such a manner that the pawl 38 is kept always in the space regardless of turning of shaft 44 so that, when the dial 48 is turned, the actuating pawl 38 is made to displace up or down along the peripheries of the cams 20 to 32 in accordance with the turning extent of the dial 48.

Now the first shaft 10 is so arranged that the cams 20 to 32 may be engaged with the actuating pawl 38. In accordance with the position of the dial 48, any one of the cams 20 to 32 may be brought into engagement with the actuating pawl 38. As set forth hereinbefore, the cams 20 to 32 are protruded radially differently. One cam has its protrusion in one direction while another cam has its protrusion in another direction. Therefore, the actuating pawl 38 positioned in one plane may be kicked by a cam at a selected time after the first curtain has been actuated while, if the same actuating pawl 38 is positioned in another selected plane, it may be kicked by another cam at another time after the same start of the first curtain, so that the second curtain may be actuated after various periods from the start of the first curtain. Thus the cams may be provided for various exposure periods. In this embodiment, the cams are allotted as follows:

Cam 20 for an exposure of $\frac{1}{1000}$ s.;
Cam 22 for $\frac{1}{500}$ s.;
Cam 24 for $\frac{1}{250}$ s.;
Cam 26 for $\frac{1}{100}$ s.;
Cam 28 for $\frac{1}{50}$ s.;
Cam 30 for five kinds of longer exposure times; and
Cam 32 for the bulb exposures.

Correspondingly to the positions of the actuating pawl 38, the dial 48 is calibrated along the periphery thereof so as to indicate the exposure periods. In operation, one may position the dial 48 at a required scale by means of turning the same manually. When the dial 48 is turned, the externally threaded member 46 is made to slide vertically carrying the actuating pawl 38 between the two flanges 60 and 62 of the member 46 so as to select a position of the actuating pawl 38 where the latter may be associated with a required one of the series of cams. After the first shaft 10 with the first curtain has been actuated in a well known manner and a required period has elapsed, the actuating pawl 38 is kicked by the selected cam resulting in that the second curtain is actuated at a required time.

It is appreciated that, while any of the first shaft 10, the pin 34, and the sleeve 70 is turned, the dial shaft 44 with the dial 48 are not being turned at all.

According to the mechanism of this invention in which the actuating pawl 38 is made to slide vertically by means of the relative motion of the externally threaded member 46 to the internally threaded member 56, it becomes possible to calibrate the speed dial 48 on an equidistant scale by virtue of the mechanism. Accordingly, by virtue of the effect, it becomes, in turn, very convenient to adopt a light value system.

FIG. 3 shows a graph in which the ordinate indicates length of the shutter slot in mm. while the abscissa indicates relative position of cam in degree of angle. When the series of cams 20 to 28 are integrated and smoothed, a helical cam shown in FIG. 4 and being corresponding to the curve shown in FIG. 3 would be obtained. By means of such a cam to be associated with the actuating pawl, a modification of this embodiment in which the exposure period may be regulated continuously variably is achieved. Thus it becomes possible to regulate any required exposure period precisely.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. In a focal plane shutter camera comprising a first movable curtain and a second movable curtain and means for moving said curtain successively across the shutter aperture with appropriate time delay so as to constitute a shutter slot between the rear edge of said first curtain and the front edge of said second curtain, a first shaft for receiving said first curtain rolled up thereon, a second shaft for receiving said second curtain rolled up thereon, said shafts mounted in parallel relationship so as to be turnable about their respective axis; a cam mounted on said first shaft for rotation therewith, said cam having a continuously varying contour in the direction of length thereof, said cam having its maximum diameter adjacent one end thereof and its minimum diameter adjacent the other end thereof, a pawl, means mounting said pawl opposite the periphery of said cam so that said pawl is turnable about an axis which is parallel to the axis of said first shaft and so that said pawl is adapted to be actuated by said cam and so that said pawl is movable in the direction of its axis so as to vary the time when it is actuated by said cam, means for moving said pawl in the direction of its axis, said means for moving said pawl axially comprising a dial shaft, a dial mounted upon said dial shaft, means mounting said dial shaft so that it is parallel to said first shaft and to the axis of said pawl and is turnable about the axis of said dial shaft but is non-slidable in the direction of the axis thereof, an externally threaded member, means mounting said externally threaded member axially slidably upon said dial shaft, an internally threaded member, means fixably mounting said internally threaded member relative to the movable members with said externally threaded member received within said internally threaded member, and a pair of axially spaced circumferential flanges on the periphery of said externally threaded member, said pawl being turnably received between said flanges, said flanges being thereby axially slidable in linear relation to the turning of said dial so as to move said pawl also in linear relation to the turning of said dial and means coupling said pawl and said second shaft for actuating said second shaft when said pawl is actuated.

2. In a focal plane shutter camera comprising a first movable curtain and a second movable curtain and means for moving said curtains successively across the shutter aperture with appropriate time delay so as to constitute a shutter slot between the rear edge of said first curtain and the front edge of said second curtain, a first shaft for receiving said first curtain rolled up thereon, and a second shaft for receiving said second curtain rolled up thereon, said shafts being mounted with parallel axes; a cam mounted on said first shaft for rotation therewith, said cam varying in contour in the direction of length thereof, a pawl, means mounting said pawl opposite the periphery of said cam so that said pawl is turnable about an axis which is parallel to the axis of said first shaft, said pawl being positioned and adapted to be actuated by said cam, said pawl being movable in the direction of its axis so as to vary the time when it is actuated by said cam, a dial shaft, a dial mounted upon said shaft, means mounting said dial shaft so that it is parallel to said first shaft and to the axis of said pawl and is turnable about the axis of said dial shaft but is non-slidable in the direction of the axis thereof, an externally threaded member, means mounting said externally threaded member axially slidably but non-rotatably upon said dial shaft, an internally threaded member, means fixably mounting said internally threaded member relative to the movable members with said externally threaded member received within said internally threaded member, a pair of axially spaced circumferential flanges on the periphery of said externally threaded member, said pawl being turnably received between said flanges, said flanges being thereby axially slidable in linear relations to the turning of said dial so as to move said pawl also in linear relation to the turning of said dial, and means coupling said pawl and second shaft for actuating said second shaft when said pawl is actuated.

3. In a focal plane shutter camera comprising a first movable curtain and a second movable curtain and means for moving said curtain successively across the shutter aperture with appropriate time delay so as to constitute a shutter slot between the rear edge of said first curtain and the front edge of said second curtain; a first shaft for receiving said first curtain rolled up thereon, a sleeve for receiving said second curtain rolled up thereon, said sleeve being turnably mounted upon said first shaft, said shaft and said sleeve being turnable about their common axis, a cam mounted on said first shaft beyond said sleeve for rotation in unison with said shaft, said cam having a varying contour in the direction of length thereof, a second shaft, means mounting said second shaft in parallel relation to said first shaft with said second shaft being turnable on its axis, said second shaft also being axially slidable, a first pawl mounted fixedly upon said second shaft opposite the periphery of said cam with said first pawl being positioned and adapted to be actuated by said cam in variable time after rotation of said first shaft begins and depending upon the axial position of said first pawl, means for moving said second shaft in the direction of its axis so as to vary the axial position of said first pawl relative to said cam said means for moving said second shaft axially comprising a dial shaft, a dial mounted upon said dial shaft, means mounting said dial shaft so that it is parallel to said first shaft and to the axis of said first pawl and is turnable on the axis of said dial shaft but is non-slidable in the direction of the axis thereof, an externally threaded member, means mounting said externally threaded member axially slidably but non-rotatably upon said dial shaft, an internally threaded member, means fixably mounting said internally threaded member relative to the movable member with said externally threaded member received within said internally threaded member, and a pair of axially spaced circumferential flanges on the periphery of said externally threaded member, said first pawl being turnably received between said flanges, said flanges being thereby axially slidable in linear relation to the turning of said dial so as to move said first pawl also in linear relation to the turning of said dial, a second pawl slidably mounted upon said second shaft but fixed in axial position relative to said sleeve, means coupling said pawls so that they are turnable in unison, and a further cam on said sleeve, said second pawl being positioned and adapted to engage and release said second curtain when said first pawl is actuated by said first mentioned cam.

4. An assembly in accordance with claim 3, said first named cam having its maximum diameter adjacent one end thereof and its minimum diameter adjacent the other end thereof.

References Cited in the file of this patent

UNITED STATES PATENTS

| | | |
|---|---|---|
| 976,712 | Whitehead | Nov. 22, 1910 |
| 2,126,302 | Young | Aug. 9, 1938 |
| 2,891,455 | Stein et al. | June 23, 1959 |